No. 870,323. PATENTED NOV. 5, 1907.
G. E. N. I. E. SUBRA.
ELASTIC TIRE FOR VEHICLE WHEELS.
APPLICATION FILED MAR. 18, 1907.

2 SHEETS—SHEET 1.

WITNESSES:

INVENTOR
Gustave Emile Noé Isidore Ernest Subra
BY
his ATTORNEY

No. 870,323. PATENTED NOV. 5, 1907.
G. E. N. I. E. SUBRA.
ELASTIC TIRE FOR VEHICLE WHEELS.
APPLICATION FILED MAR. 18, 1907.

2 SHEETS—SHEET 2.

WITNESSES:
James H. Goggin
Louise M. Boerlage

INVENTOR
Gustave Emile Noé Isidor Ernest Subra
BY L. H. Böhm
his ATTORNEY.

UNITED STATES PATENT OFFICE.

GUSTAVE EMILE NOÉ ISIDORE ERNEST SUBRA, OF PARIS, FRANCE.

ELASTIC TIRE FOR VEHICLE-WHEELS.

No. 870,323.

Specification of Letters Patent.

Patented Nov. 5, 1907.

Application filed March 18, 1907. Serial No. 362,842.

*To all whom it may concern:*

Be it known that I, GUSTAVE EMILE NOÉ ISIDORE ERNEST SUBRA, a citizen of the Republic of France, and resident at Paris, France, have invented a new and useful Elastic Tire for Vehicle-Wheels, which elastic tire is fully set forth in the following specification.

The present invention relates to a resilient tire applicable to the wheels of any vehicles with animal, mechanical, etc. traction.
This tire is illustrated, by way of example, in the accompanying drawing.

Figure 1:
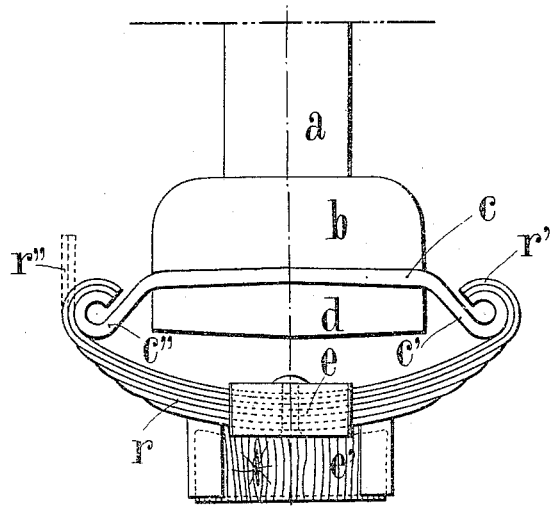
Figure 2:
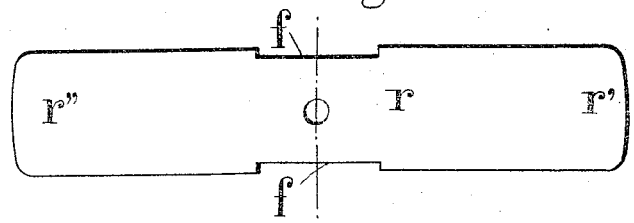
Figure 3:
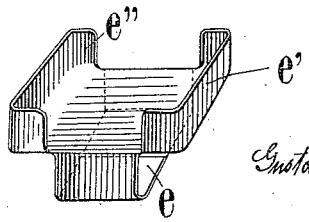
Figure 4:
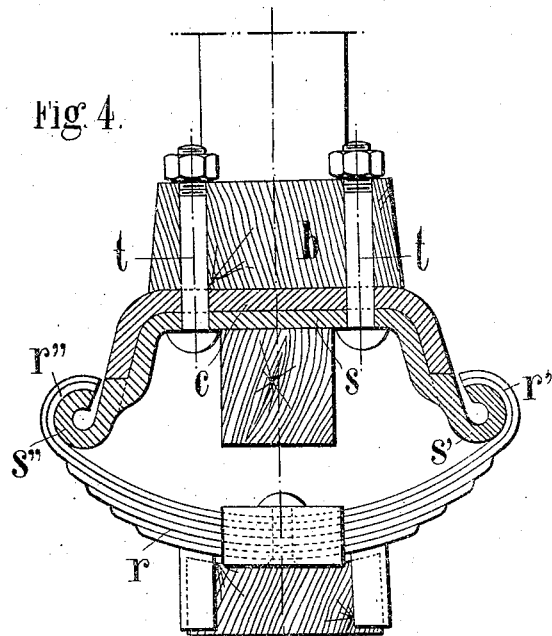
Figure 5:
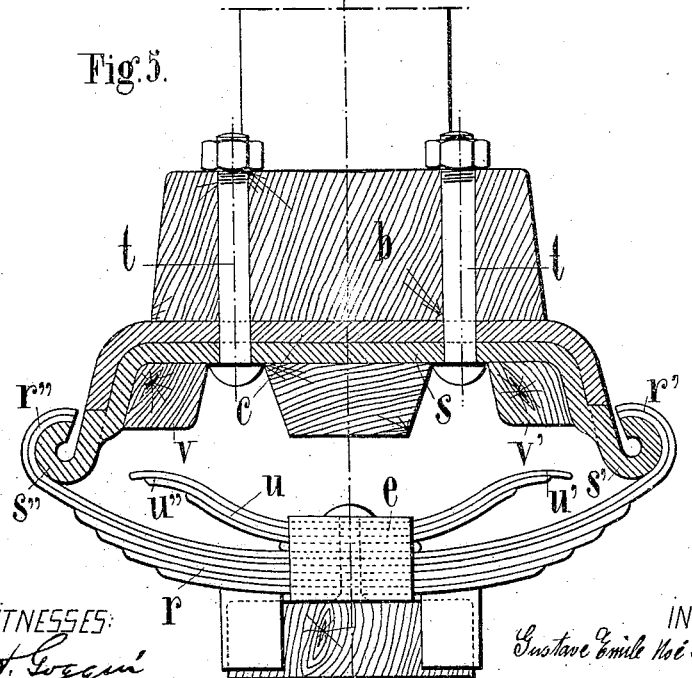

Figure 1 represents partly in section a complete tire. Fig. 2 is a top view of one of the spring blades. Fig. 3 is a perspective view showing the method of fixing the tread blocks to the blades constituting springs. Fig. 4 shows a method of mounting the elastic elements on the rim. Fig. 5 illustrates a modified construction.

On the wooden rim $b$ secured to the spokes $a$, is mounted a metal rim $c$ (Fig. 1). On the said rim $c$ are arranged springs $r$ similar to carriage springs and constituted by superposed blades. Each group touches the adjoining ones in such manner that the different groups of spring blades form a continuous surface all round the rim $c$, but no one of the groups is connected to its neighbors, so that it retains its own resiliency and can play relatively to the adjoining groups.

The number of superposed blades constituting each group of the springs $r$ may be any desired, and will depend on the resiliency to be obtained and on the weight of the vehicle.

For fitting up the various groups on the metal rim $c$, the proceeding is as follows—One of the ends of the spring blades $r$ is bent at $r'$ so as to engage with the projecting portion $c'$ of the metal rim. The other end of the same springs is annealed and straightened at $r''$ as shown in Fig. 1. At the moment of fitting, the annealed portion $r''$ is beaten down by a hammer against the projecting portion $c''$ of the metal rim, and in this way each group of springs is connected to the metal rim in such a manner that the springs can play without leaving the rim.

This device has moreover the advantage of enabling one group of springs to be easily replaced on the road in case it breaks, or is damaged. As will be readily understood, it will be sufficient to replace a group of springs to straighten the end $r''$ and to disengage then the bent end $r'$.

Each group of springs is secured to a tread block which can be made of any suitable material; rubber, wood, copper, cast steel, etc.

The solidarity between a group of springs and the tread block is obtained by means of a part shown in Fig. 3. The bent portion $e$ engages with the springs $r$, and the widened portion $e'$ with flange $e''$ serves to hold the tread block. As the bent portion $e$ increases the thickness of the spring blades $r$, the latter are recessed, as shown in Fig. 2, at $f$, in order that, as already stated, the different blades of each group should exactly touch the blades of the adjoining groups.

It is evident that instead of having tread blocks independent of each other, the various groups of springs could be secured to a single tread band extending throughout the whole circumference of the wheel. By means of this arrangement, a tire is obtained comprising elastic elements independent of each other, each of them preserving all its resiliency and being able to bend while its neighbors remain inoperative.

A stop $d$ secured to the metal rim $c$, limits the bending of the springs $r$ in case of violent shocks.

The above described arrangement, however, is not very well adapted when applied to so called heavy vehicles.

Fig. 4 shows a device enabling the series of elastic elements to be applied to the rim, the springs of the said elements having arrived at the last stage of their manufacture, that is to say, secured at both their ends. This method of fitting is just as applicable to tires for the wheels of heavy weight vehicles, as for wheels of any other vehicles with animal, mechanical, and other traction.

The springs $r$ taken separately, are bent at both their ends to the desired shape, then tempered and provided with the tread block. Then the suitably rounded-off flanges $s'$ $s''$ of a member made up of sections which extend around the wheel rim are introduced into the ends of each of the springs $r$ constructed as described.

On the other hand, the metal rim of the cross-section already described, is provided with recesses made in its flanges and corresponding to the width of the parts $s$. The parts $s$ are of such cross-section that they occupy the outer peripheral channel of the rim at the same time as they engage with the recesses of the flanges. They are secured in that position by means of bolts $t$ passing through the metal rim $c$ and the wooden rim $b$. The flanges $s'$ $s''$ of the parts $s$ being in line with the extension of the flanges of the metal rim, this method of fitting does not present any drawbacks as regards longitudinal strains acting on the elastic elements.

Whatever be the method of fitting adopted, whether that shown in Fig. 1 or that shown in Fig. 4, to each elastic element may be added a second spring $u$, Fig. 5, which is secured to the bracket $e$, and of which the free ends $u'$ $u''$ at a certain degree of bending of the spring $r$ can come against stops $v$ $v'$ arranged in the peripheral channel of the member $s$. In this way, for a light or medium load of the vehicle, the springs $r$ of the elastic elements act alone. If the load is increased, the bending of the springs $r$ increases, and the springs $u$, coming to rest against the stops $v$ $v'$, add their resiliency to that of the springs $r$.

Having thus described my invention I claim as new and desire to secure by Letters Patent,

1. An elastic tire for vehicle wheels connected to the wheel rim comprising a steel rim mounted on said wheel rim and having curved portions beyond same, steel springs composed each of a number of curved blades on said metal rim, having bent up portions conforming in shape to the curved portions of the metal rim and recesses in their middle portion, a tread in connection with said springs, an intermediate device connecting the springs and said tread having a hollow portion surrounding the recessed portion of the spring and an extended portion adapted to receive and support the tread, and a stop block located within the peripheral channel of the metal rim.

2. An elastic tire for vehicle wheels connected to the wheel rim comprising a steel rim bent outwardly at its ends, strengthening members below said rim in conformity thereto, securing bolts passing through the wheel rim said metal rim and said members, curved bent end portions formed on each member, steel springs composed each of a number of curved blades one on each member, having bent up portions conforming in shape to the curved portions of the metal rim and recesses in their middle portion, a tread in connection with said springs, an intermediate device connecting the springs and said tread having a hollow portion surrounding the recessed portion of the spring and an extended portion adapted to receive and support the tread, and a stop block located within the peripheral channel of the metal rim.

3. An elastic tire for vehicle wheels connected to the wheel rim comprising a steel rim bent outwardly at its ends, strengthening members below said rim in conformity thereto, securing bolts passing through the wheel rim said metal rim and said members, curved bent end portions formed on each member, steel springs composed each of a number of curved blades one on each member, having bent up portions conforming in shape to the curved portions of the metal rim and recesses in their middle portion, a tread in connection with said springs, an intermediate device connecting the springs and said tread having a hollow portion surrounding the recessed portion of the spring and an extended portion adapted to receive and support the tread, a second elastic steel spring secured inside of the first steel spring, and three stop blocks in the peripheral channel of the inner strengthening member.

In testimony whereof I have signed this specification in the presence of two subscribing witnesses.

GUSTAVE EMILE NOÉ ISIDORE ERNEST SUBRA.

Witnesses:
   EMILE LEOTRET,
   DEAN B. MASON.